(12) United States Patent
Nara

(10) Patent No.: US 11,359,910 B2
(45) Date of Patent: Jun. 14, 2022

(54) INSPECTION METHOD, CORRECTION METHOD, AND INSPECTION DEVICE

(71) Applicant: MITUTOYO CORPORATION, Kanagawa (JP)

(72) Inventor: Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 64 days.

(21) Appl. No.: 16/990,269

(22) Filed: Aug. 11, 2020

(65) Prior Publication Data

US 2021/0063139 A1    Mar. 4, 2021

(30) Foreign Application Priority Data

Aug. 26, 2019    (JP) .............................. JP2019-153575

(51) Int. Cl.
     *G01B 11/00*      (2006.01)
     *G01N 21/17*      (2006.01)

(52) U.S. Cl.
     CPC ........... *G01B 11/002* (2013.01); *G01N 21/17* (2013.01); *G01N 2021/1785* (2013.01)

(58) Field of Classification Search
     CPC .... G01B 11/002; G01B 21/042; G01B 11/24; G01B 5/008; G01B 21/045; G01B 11/14; G01B 21/04; G01N 21/17; G01N 2021/1785; G01S 7/4804; G01S 7/497; G01S 17/42; G01S 17/89; G01S 17/46;

(Continued)

(56) References Cited

U.S. PATENT DOCUMENTS 6,420,698 B1 *   7/2002   Dimsdale .............. G01S 7/4811
                                                 250/205
7,643,135 B1 *   1/2010   Walsh ..................... G01S 7/497
                                                 356/140

(Continued)

FOREIGN PATENT DOCUMENTS

CA       2739030 A1 * 11/2011  ............. G01B 11/25
CA       2830297 A1 *  4/2014  ............... G01C 1/04

(Continued)

OTHER PUBLICATIONS

ISO 10360-10:2016(E) Annex B, "Calibrated test lengths" pp. 27-28, Apr. 4, 2016.

*Primary Examiner* — Mohamed K Amara
(74) *Attorney, Agent, or Firm* — Greenblum & Bernstein, P.L.C.

(57) ABSTRACT

An inspection method, correction method, and inspection device that include measuring a first spatial position where laser light is emitted at a first region and measuring a first strike position where the inspection device is struck by the laser light in the first region, the measurements being performed by emitting the laser light at the first region of the inspection device; measuring a second spatial position where the laser light is emitted at a second region and measuring a second strike position where the inspection device is struck by the laser light in the second region, the measurements being performed by emitting the laser light at the second region of the inspection device; and comparing measurement results for the first spatial position and the second spatial position with measurement results for the first strike position and the second strike position.

17 Claims, 7 Drawing Sheets

(58) Field of Classification Search
CPC ...... G01S 17/48; G01S 7/4808; G01S 7/4912; G05B 2219/50057; G05B 2219/37193; G06F 17/12; G06F 17/15
See application file for complete search history.

(56) References Cited

U.S. PATENT DOCUMENTS

| | | | |
|---|---|---|---|
| 7,693,325 B2* | 4/2010 | Pulla | G06T 11/60 |
| | | | 356/138 |
| 9,091,530 B1* | 7/2015 | Ashford | G01B 21/042 |
| 9,115,973 B2 | 8/2015 | Suzuki et al. | |
| 9,316,487 B2 | 4/2016 | Nara et al. | |
| 9,752,863 B2* | 9/2017 | Hinderling | G01S 17/42 |
| 10,557,941 B2 | 2/2020 | Yanaka et al. | |
| 2007/0103698 A1* | 5/2007 | Liu | G01B 11/14 |
| | | | 356/620 |
| 2017/0180703 A1* | 6/2017 | Kovacovsky | G01S 17/46 |
| 2017/0195589 A1* | 7/2017 | Kovacovsky | G01S 17/89 |
| 2019/0187660 A1 | 6/2019 | Yanaka et al. | |
| 2019/0187661 A1 | 6/2019 | Yanaka et al. | |
| 2020/0072591 A1 | 3/2020 | Hagino et al. | |
| 2020/0164463 A1* | 5/2020 | Shibazaki | B23Q 3/186 |
| 2021/0223397 A1* | 7/2021 | Bertoni | G01B 11/25 |

FOREIGN PATENT DOCUMENTS

| | | | | |
|---|---|---|---|---|
| CN | 103415780 A * | 11/2013 | | G01B 11/14 |
| DE | 102016008689 A1 * | 2/2017 | | G01B 11/00 |
| EP | 2523017 A1 * | 11/2012 | | G01B 11/002 |
| WO | WO-0216865 A2 * | 2/2002 | | G01B 3/30 |
| WO | WO-2010058001 A * | 5/2010 | | G01B 11/002 |
| WO | WO-2018140480 A1 * | 8/2018 | | G01S 17/42 |

* cited by examiner

INSPECTION METHOD, CORRECTION METHOD, AND INSPECTION DEVICE

CROSS-REFERENCE TO RELATED APPLICATIONS

The present application claims priority under 35 U.S.C. § 119 of Japanese Application No. 2019-153575, filed on Aug. 26, 2019, the disclosure of which is expressly incorporated by reference herein in its entirety.

BACKGROUND OF THE INVENTION

1. Field of the Invention

The present invention relates to an inspection method, a correction method, and an inspection device.

2. Description of Related Art

As a measurement device that acquires three-dimensional shape data for industrial products, structures, and so on, a three-dimensional laser scanner is known that fires (emits) laser light at a measured object (measurable object) and detects the reflected light. A laser tracker is a known example of a measurement device having functions and mechanisms similar to such a three-dimensional laser scanner, and an inspection method of the laser tracker is also known (see, for example, ISO 10360-10 Annex B).

Unlike the three-dimensional laser scanner, the laser tracker measures a distance, direction, or the like to the measured object by, for example, arranging a retroreflector (target) on the measured object and exerting control such that laser light continuously strikes a strike position of the retroreflector (tracking). A commonly-known inspection method of the laser tracker uses a retroreflector of this kind. However, the three-dimensional laser scanner does not have a retroreflector and so the same type of inspection cannot be used. Therefore, there is a desire to make inspection of a three-dimensional laser scanner easy to perform.

SUMMARY OF THE INVENTION

The present invention has been devised in view of these circumstances, and makes inspection of a three-dimensional laser scanner easy to perform.

One aspect of the present invention provides an inspection method for a three-dimensional laser scanner that measures a spatial position, which is a position where laser light is emitted at a measured object, by emitting the laser light toward the measured object and collecting light reflected by the measured object. The method includes measuring a first spatial position where the laser light is emitted at a first region of an inspection device by emitting the laser light at the first region; measuring a first strike position where the inspection device is struck by the laser light in the first region; measuring a second spatial position where the laser light is emitted at a second region of the inspection device that is different from the first region by emitting the laser light at the second region; measuring a second strike position where the inspection device is struck by the laser light in the second region; and comparing measurement results for the first spatial position and the second spatial position obtained by the three-dimensional laser scanner with measurement results for the first strike position and the second strike position obtained by the inspection device.

The inspection device may include a first sensor provided in the first region and a second sensor provided in the second region, separated from the first sensor by a predetermined reference interval in a predetermined direction. In measuring the first spatial position, the laser light may be emitted at the first sensor to measure the first spatial position. In measuring the first strike position, the first strike position may be measured with the first sensor. In measuring the second spatial position, the laser light may be emitted at the second sensor to measure the second spatial position. In measuring the second strike position, the second strike position may be measured with the second sensor.

The inspection device may include a first sensor provided so as to be capable of displacing from the first region to the second region. In measuring the first spatial position, the laser light may be emitted at the first sensor, which is positioned in the first region, to measure the first spatial position. In measuring the first strike position, the first strike position may be measured with the first sensor, which is positioned in the first region. In measuring the second spatial position, the laser light may be emitted at the first sensor, which is displaced from the first region and positioned in the second region, to measure the second spatial position. In measuring the second strike position, the second strike position may be measured with the first sensor, which is positioned in the second region.

Measuring the second spatial position may also include displacing the first sensor that is positioned in the first region by the predetermined reference interval in the predetermined direction to position the first sensor in the second region.

The inspection device may also include a positioning device to which the first sensor is attached and which is capable of displacing the first sensor from the first region to the second region.

Measuring the first spatial position may further include positioning the first sensor, which is attached to the positioning device, within the first region using the positioning device. In measuring the first strike position, the first strike position may be measured based on the position set by the positioning device and a detected position obtained by the first sensor. Measuring the second spatial position may further include displacing the first sensor from the first region to the second region and positioning the first sensor within the second region using the positioning device. In measuring the second strike position, the second strike position may be measured based on the position set by the positioning device and the detected position obtained by the first sensor.

The inspection device may include a first sensor and a positioning device to which the first sensor is attached and which is capable of displacing the first sensor from the first region to the second region. Measuring the first spatial position may include displacing and positioning the first sensor using the positioning device such that the first sensor is capable of collecting the laser light emitted at the first region, and measuring the first spatial position of the laser light emitted at the positioned first sensor. In measuring the first strike position, the first strike position may be measured based on a position within the first region set by the positioning device and a detected position obtained by the first sensor. Measuring the second spatial position may include displacing and positioning the first sensor using the positioning device such that the first sensor is capable of collecting the laser light emitted at the second region, and measuring the second spatial position of the laser light emitted at the positioned first sensor. In measuring the second strike position, the second strike position may be measured based on a position within the second region that is set by the positioning device and a detected position obtained by the first sensor after displacement.

The positioning device may be, for example, a coordinate measuring device. Comparing may include comparing coordinates for the first spatial position with coordinates for the first strike position, and comparing coordinates for the second spatial position with coordinates for the second strike position.

Comparing may also include calculating, based on the first spatial position and the second spatial position, a first measurement distance between the positions in the first region and the second region where the laser light strikes; calculating, based on the first strike position and the second strike position, a second measurement distance between the positions in the first region and the second region where the laser light strikes; and comparing the first measurement distance with the second measurement distance.

Another aspect of the present invention is a correction method for a three-dimensional laser scanner that further includes, after inspecting the three-dimensional laser scanner using the inspection method described above, and based on inspection results, calculating a correction value for correcting the measurement results of the three-dimensional laser scanner for the spatial positions.

Another aspect of the present invention is an inspection device used to inspect a three-dimensional laser scanner that measures a spatial position, which is a position where laser light is emitted at a measured object, by emitting the laser light toward the measured object and collecting light reflected by the measured object. The inspection device includes a casing, a first sensor provided in a first region of the casing, and a second sensor provided in a second region, separated from the first sensor by a predetermined reference interval in a predetermined direction.

Another aspect of the present invention is an inspection device used to inspect a three-dimensional laser scanner that measures a spatial position, which is a position where laser light is emitted at a measured object, by emitting the laser light toward the measured object and collecting light reflected by the measured object. The inspection device includes a casing, a first sensor, and a displacer displacing the first sensor from a predetermined first region of the casing to a second region that is separated from the first region by a predetermined reference interval in a predetermined direction.

The displacer is a positioning device and the first sensor may be attached to the positioning device. A surface of the first sensor that collects light may include a fashioned region that causes at least a portion of the incident light to undergo diffused reflection or retroreflection.

According to the present invention, inspection of a three-dimensional laser scanner can be performed easily.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Exemplary Configuration of Inspection System S

Figure 1:
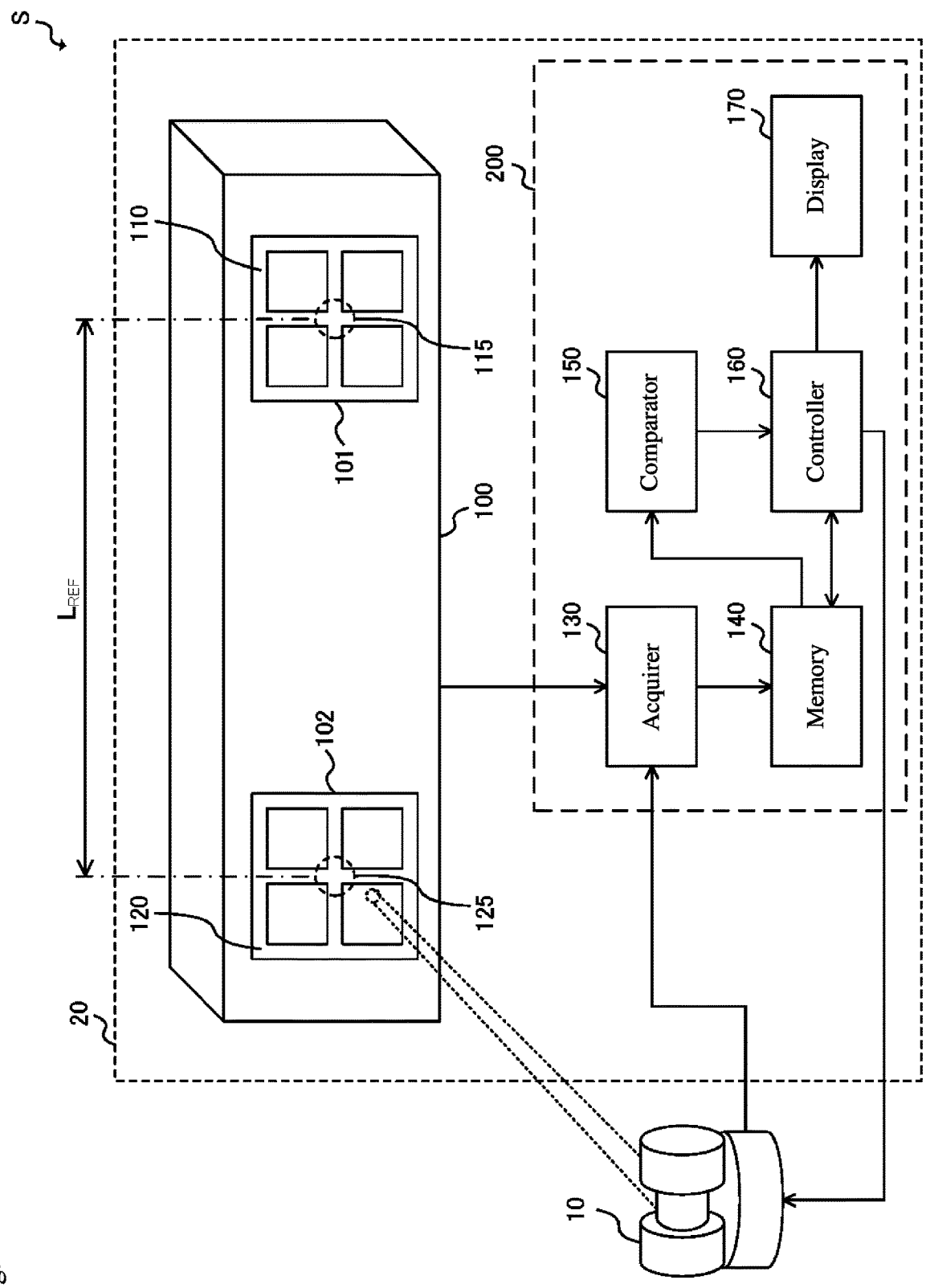
FIG. 1 is a first exemplary configuration of an inspection system S according to an embodiment.

FIG. 1 illustrates a first exemplary configuration of an inspection system S according to the present embodiment. The inspection system S inspects a three-dimensional laser scanner 10. Such an inspection may be used, for example, to determine acceptable and unacceptable products in a delivery stage of the three-dimensional laser scanner 10, verify measurement accuracy, measure changes over time, adjust internal parts of an apparatus, perform calibration, and the like. The inspection system S includes the three-dimensional laser scanner 10 as the object to be inspected and an inspection device 20.

By emitting laser light toward a measured object (measurable object) and collecting the light reflected by the measured object, the three-dimensional laser scanner 10 measures a spatial position where laser light is emitted at a measured object. The spatial position measured by the three-dimensional laser scanner 10 includes, for example, a distance from the three-dimensional laser scanner 10 to the measured object and coordinates of the measured object. In addition, the three-dimensional laser scanner 10 may also measure information for the position where the laser light strikes, such as reflection intensity, reflectance, color information, and the like.

The three-dimensional laser scanner 10 measures the distance to the position on the measured object where laser light strikes based on the time elapsed from the laser light being emitted until the reflected light returns. In addition, based on the direction in which the laser light is emitted, the three-dimensional laser scanner 10 measures the coordinates of the position where the laser light strikes. The three-dimensional laser scanner 10 may also fire laser light at a plurality of different positions of the measured object, measure the distance to and/or the coordinates for the plurality of positions, and analyze the shape of the measured object.

The three-dimensional laser scanner 10 may, for example, have an optical system that includes a mirror or the like that is provided so as to rotate centered on two different axes, and may scan the emitting direction of the laser light in two different directions. Furthermore, the three-dimensional laser scanner 10 may, for example, have a rotary encoder that measures a rotation angle of the mirror, and may calculate the emitting direction of the laser light as well as the direction in which the light is reflected back.

An optical system of the three-dimensional laser scanner 10 may, for example, include a lens with a variable focal length, and may automatically match the focal point position to the surface of the measured object. In addition, the optical system may be configured to allow the laser light reflected off the surface of the measured object to be condensed and collected by a photodetector element or the like. Such a configuration for the three-dimensional laser scanner 10 is commonly known and a detailed description thereof is omitted in this discussion.

The inspection device 20 is used to inspect the three-dimensional laser scanner 10. The inspection device 20 acquires measurement results obtained by the three-dimensional laser scanner 10 for the spatial position of the inspection device 20 and inspects the three-dimensional laser scanner 10 based on the acquired measurement results as well as measurement results obtained by the inspection device 20 for a laser light strike position. The inspection device 20 includes a casing 100 and a control device 200. The casing 100 is provided with a first sensor 110 and a second sensor 120. The control device 200 includes an acquirer 130, a memory 140, a comparator 150, a controller 160, and a display 170. The control device 200 may be, for example, a computer which may carry out operations as the acquirer 130, the comparator 150, and the controller 160 by executing a program.

The laser light from the three-dimensional laser scanner 10 is emitted at the casing 100. The casing 100 is preferably formed of a material that undergoes little deformation due to changes in temperature, aging, or the like. The casing 100 may include materials such as carbon fiber reinforced plastics (CFRP) or ceramics, for example. The casing 100 may also be formed by a metal, for example.

The casing 100 includes regions at which the laser light is emitted: a first region 101 and a second region 102. A light sensor for detecting the laser light is provided to the first region 101 and the second region 102. The first region 101 and the second region 102 are preferably regions with a similar size to a light-collecting field where a light sensor is configured to be capable of detecting light. FIG. 1 illustrates an example where the first sensor 110 and the second sensor 120 are provided to the casing 100 as light sensors.

The first sensor 110 is provided to the first region 101. The second sensor 120 is provided to the second region 102. The first sensor 110 and the second sensor 120 include a plurality of photodetector elements. The photodetector elements are elements that output electric current or voltage of a magnitude that corresponds to an input light intensity level. The photodetector elements may be photodiodes or CCDs, for example.

The first sensor 110 is a light sensor which, when the laser light is emitted at the first region 101, is capable of detecting the position on the first region 101 that the laser light strikes. In this example, the laser light strike position detected by the first sensor 110 is treated as a first strike position. The first strike position may be coordinates or a distance from a predetermined position on a light-collecting surface of the first sensor 110, for example. The light-collecting fields of the plurality of photodetector elements that configure the first sensor 110 are provided in the first region 101.

Similar to the first sensor 110, the second sensor 120 is a light sensor which, when the laser light is emitted at the second region 102, is capable of detecting the position on the second region 102 that the laser light strikes. In this example, the laser light strike position detected by the second sensor 120 is treated as a second strike position. The second strike position may be coordinates or a distance from a predetermined position on a light-collecting surface of the second sensor 120, for example.

The first sensor 110 and the second sensor 120 are light sensors that are capable of detecting a two-dimensional position in the light-collecting field that light strikes and may be, for example, a segmented photodiode, a photosensitive detector (PSD), or a CCD. FIG. 1 illustrates an example where the first sensor 110 and the second sensor 120 are four-element segmented photodiodes having four photodetectors.

A four-element segmented photodiode is an element that outputs two-dimensional coordinates of incident light in response to a striking area of light that strikes the four photodiodes. In addition, the four-element segmented photodiode may include gap regions, for example, which are dead zones between adjacent photodiodes where light cannot be detected. The width of the gap regions is configured to be smaller than the diameter of the laser light beam.

For example, a target region 115 that is a dead zone is provided at the center of the light-collecting surface of the first sensor 110 and a target region 125 that is a dead zone is provided at the center of the light-collecting surface of the second sensor 120. In doing so, when the laser light is emitted at the first region 101 and the output level is approximately zero, it is possible to detect that the laser light is being emitted at the target region 115, which is at the center of the first region 101. Similarly, when the laser light is emitted at the second region 102 and the output level is approximately zero, for example, it is possible to detect that the laser light is being emitted at the target region 125, which is at the center of the second region 102.

The three-dimensional laser scanner 10 is preferably fashioned so as to be capable of readily detecting the spatial positions of the first sensor 110 and the second sensor 120 configured in this way, and the surfaces of the first sensor 110 and the second sensor 120 are preferably fashioned so as to reduce a specular reflection component of the incident light.

For example, at least a portion of the surfaces of the first sensor 110 and the second sensor 120 that collects the light includes a fashioned region that causes at least a portion of the incident light to undergo diffused reflection or retroreflection. The fashioned region may have the surface roughened, for example, or alternatively may have a plurality of minute, highly refractive glass beads acting as lenses distributed substantially uniformly as a reflective material.

The first sensor 110 and the second sensor 120 noted above are arranged at respective predetermined positions on the casing 100. For example, the second sensor 120 may be provided in the second region, which is separated by a predetermined reference interval in a predetermined direction from the first region 101 where the first sensor 110 is provided. FIG. 1 illustrates an example where the center position of the first sensor 110 and the center position of the second sensor 120 are provided separated by a reference interval $L_{REF}$ on a surface of the casing 100 that faces the three-dimensional laser scanner 10. Accordingly, when the three-dimensional laser scanner 10 emits laser light at the center position of the first sensor 110 and the center position of the second sensor 120 and measures a distance between the centers, ideal measurement results will match the reference interval $L_{REF}$.

The acquirer 130 acquires detection results of the first sensor 110 and the second sensor 120 as measurement results of the detection device 20. In addition, the acquirer 130 acquires the measurement results of the three-dimensional laser scanner 10. The measurement results of the three-dimensional laser scanner 10 include results obtained by the three-dimensional laser scanner 10 emitting a laser at the first region 101 of the casing 100 to measure a first spatial position, which is the position where the laser light is emitted at the first region 101. In addition, the measurement results of the three-dimensional laser scanner 10 include results obtained by the three-dimensional laser scanner 10 emitting a laser at the second region 102 of the casing 100 to measure a second spatial position, which is the position where the laser light is emitted at the second region 102.

The memory 140 stores information on the measurement results acquired by the acquirer 130. The memory 140 may store intermediate data generated (or used) in the course of operations by the detection device 20; calculation results; threshold values; and parameters, for example. Furthermore, the memory 140 may also supply the stored data to the controller 160 or a recipient designated by the controller 160 in response to a request from the controller 160, for example.

The comparator 150 compares the measurement results for spatial position obtained by the three-dimensional laser scanner 10 and the measurement results for strike position obtained by the inspection device 20. The comparator 150 outputs the comparison results as inspection results. The comparator 150 may also output inspection results that correspond to the comparison results.

The controller 160 controls operations of the inspection device 20 and the three-dimensional laser scanner 10 to inspect the three-dimensional laser scanner 10. The controller 160 may also display the inspection results on the display 170, and may print out the inspection results using a printer or the like. In addition, the controller 160 may also store the inspection results in the memory 140, or may instead, or in addition to the memory 140, store the inspection results in an external database or the like. In such a case, the controller 160 is preferably connected to a network or the like.

The display 170 includes a display panel or the like and displays the measurement results of the inspection device 20. In addition, the display 170 may also display the status, progress, and the like of control operations by the controller 160. The display 170 may also receive control instructions from a user, for example, and supply the instructions to the controller 160.

The inspection system S described above inspects the three-dimensional laser scanner 10 based on the measurement results of the three-dimensional laser scanner 10 and the measurement results of the inspection device 20. Conventionally, there is no particular established method for inspecting the three-dimensional laser scanner 10. For example, laser light may be emitted at a plurality of objects arranged at a predetermined distance and the distances between the objects may be measured to perform the inspection. However, there are instances where complex devices and complex procedures may be required to obtain a high degree of accuracy when verifying the position where the laser actually strikes the object, to understand the distance actually measured by the three-dimensional laser scanner 10, and the like. Given this, the inspection system S according to the present embodiment can effectively inspect the three-dimensional laser scanner 10 by using the inspection device 20, which has a simple configuration provided with a light sensor. Operations of such an inspection system S are described next.

First Exemplary Operation Flow for Inspection System S

Figure 2:
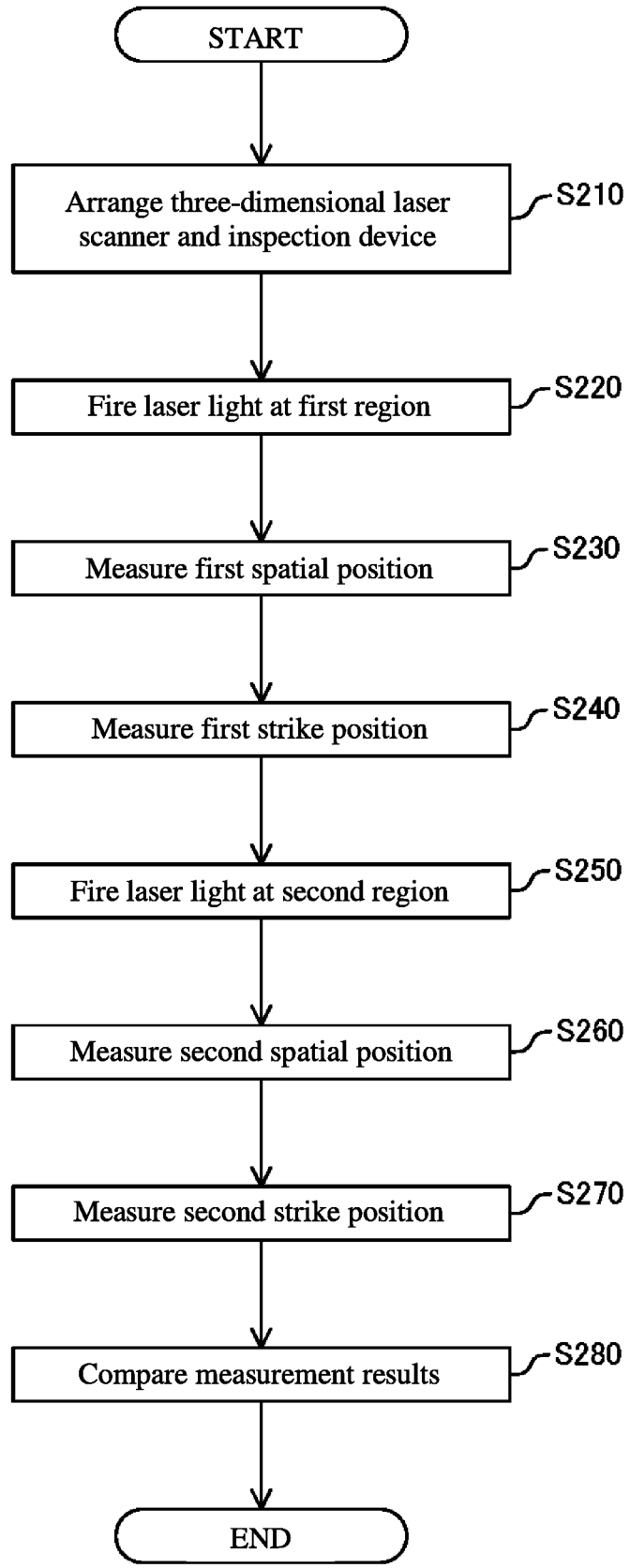
FIG. 2 is a first exemplary operation flow for the inspection system S according to the embodiment.

FIG. 2 is a first exemplary operation flow for the inspection system S according to the present embodiment. The inspection system S inspects the three-dimensional laser scanner 10 by executing operations S210 to S280. The inspection system S may, for example, execute operations S210 to S280 as a product inspection at a factory shipment stage, or may execute the operations to check for aging.

First, the three-dimensional laser scanner 10 and the inspection device 20 are arranged (S210). The inspection device 20 is arranged in a range capable of measuring the three-dimensional laser scanner 10. For example, the three-dimensional laser scanner 10 and the inspection device 20 are arranged such that the surface of the inspection device 20 to which the first sensor 110 and the second sensor 120 are provided is opposite the location on the three-dimensional laser scanner 10 that emits laser light.

Next, the controller 160 controls the three-dimensional laser scanner 10 to fire laser light at the first region 101 of the inspection device 20 (S220). Then the three-dimensional laser scanner 10 emits laser light at the first region 101 and measures the first spatial position (S230). Since the first sensor 110 is provided to the first region 101, the three-dimensional laser scanner 10 measures the first spatial position by emitting laser light at the first sensor 110. The acquirer 130 acquires the measurement results of the three-dimensional laser scanner 10 for the first spatial position.

Next, the inspection device 20 measures a first strike position where the laser light strikes the first region 101 (S240). The inspection device 20 measures the first strike position using the first sensor 110. The first strike position is configured by two-dimensional coordinates that are detected by the first sensor 110. The acquirer 130 acquires the measurement results of the inspection device 20 for the first strike position.

Next, the controller 160 controls the three-dimensional laser scanner 10 to fire laser light at the second region 102 of the inspection device 20, which is different from the first region 101 (S250). Then the three-dimensional laser scanner 10 measures the second spatial position where the laser light is emitted at the second region 102 (S260). Since the second sensor 120 is provided to the second region 102, the three-dimensional laser scanner 10 measures the second spatial position by emitting laser light at the second sensor 120. The acquirer 130 acquires the measurement results of the three-dimensional laser scanner 10 for the second spatial position.

Next, the inspection device 20 measures a second strike position where the laser light strikes the second region 102 (S270). The inspection device 20 measures the second strike position using the second sensor 120. The second strike position is configured by two-dimensional coordinates that are detected by the second sensor 120. The acquirer 130 acquires the measurement results of the inspection device 20 for the second strike position.

Next, the comparator 150 compares the measurement results for the first spatial position and second spatial position obtained by the three-dimensional laser scanner 10 and the measurement results for the first strike position and second strike position obtained by the inspection device 20 (S280). For example, based on the first spatial position and the second spatial position, the comparator 150 may calculate a first measurement distance $L_{MEAS}$ between the positions in the first region 101 and the second region 102 where the laser light is emitted. In such a case, the comparator 150, as an example, may calculate a first measurement distance from the coordinates included in the first spatial position and the coordinates included in the second spatial position.

In addition, based on the first strike position and the second strike position, the comparator 150 calculates a second measurement distance between the positions in the first region and the second region that are struck by the laser light. For example, the comparator 150 may consider the values for the first strike position and the second strike position in light of the reference interval $L_{REF}$ to calculate the second measurement distance. The values for the first strike position and the second strike position are, for example, used to calculate a projection in the direction of a segment that links the centers of the first sensor 110 and the second sensor 120, and to calculate the second measurement distance by adding the calculated projection value to the reference interval $L_{REF}$.

In addition, the comparator 150 compares the calculated first measurement distance and second measurement distance. When the first measurement distance and the second measurement distance match within a predetermined first range, for example, the comparator 150 may determine that the three-dimensional laser scanner 10 is an acceptable product. In addition, when a difference between the first measurement distance and the second measurement distance exceeds the predetermined first range and is within a predetermined second range, the comparator 150 may determine that the three-dimensional laser scanner 10 requires adjustment. Moreover, when the difference between the first measurement distance and the second measurement distance exceeds the predetermined second range, the comparator 150 may determine that the three-dimensional laser scanner 10 is an unacceptable product. Alternatively, the comparator 150 may output the difference between the first measurement distance and the second measurement distance as the inspection results.

The controller 160 outputs the inspection results of the comparator 150 to the display 170. The controller 160 may also output the inspection results via a network or the like. As noted above, an inspection system S according to the present embodiment compares the first measurement distance, which is the measurement result of the interval between the first sensor 110 and the second sensor 120 obtained by the three-dimensional laser scanner 10, with the second measurement distance, which is the measurement result of the interval between the first sensor 110 and the second sensor 120 obtained by the inspection device 20, in order to inspect the three-dimensional laser scanner 10.

As noted above, the first sensor 110 is provided to the inspection device 20 in the first region 101 and the second sensor 120 is provided to the inspection device 20 in the second region 102, separated by a reference interval. Accordingly, when the three-dimensional laser scanner 10 measures the first measurement distance between the first region 101 and the second region 102, the inspection device 20 can confirm, using the first sensor 110 and the second sensor 120, that the laser light emitted by the three-dimensional laser scanner 10 is collected. In addition, the first sensor 110 and the second sensor 120 can detect the two-dimensional position that is struck by the laser, and therefore can measure the second measurement distance while confirming that the laser light is collected. Accordingly, by causing the three-dimensional laser scanner 10 to measure the first measurement distance of the inspection device 20, the inspection system S can acquire the first measurement distance and the second measurement distance and compare the two, and therefore can easily inspect the three-dimensional laser scanner 10.

Furthermore, the first sensor 110 and the second sensor 120 respectively include a plurality of photodetector elements, and therefore can accurately detect the strike position of the laser. In this way, the inspection device 20 can measure the second measurement distance with a good degree of accuracy.

An example is described above of the inspection device 20 according to the present embodiment, in which the two light sensors (first sensor 110 and second sensor 120) are provided to the casing 100. However, the present invention is not limited to this. Three or more light sensors may be provided to the casing 100 of the inspection device 20. Also, a plurality of light sensors may be arrayed in a single direction, or alternatively may be arrayed in two or more different directions. By doing so, the inspection system S can efficiently carry out inspection of the three-dimensional laser scanner 10 in various directions by causing the three-dimensional laser scanner 10 to measure a reference interval in various directions of the inspection device 20.

Furthermore, an example is described above of the operations of the inspection system S according to the present embodiment, in which the three-dimensional laser scanner 10 measures the first measurement distance of the inspection device 20 only once. However, the present invention is not limited to this. The inspection system S may also cause the three-dimensional laser scanner 10 to carry out measurement of the first measurement distance a plurality of times and output inspection results based on the plurality of measurement results. In such a case, the measurement of the first measurement distance may be repeated as the relative positions of the three-dimensional laser scanner 10 and the casing 100 change.

An example is described above of the inspection device 20 according to the present embodiment, in which light sensors (first sensor 110 and second sensor 120) are fixed in place. However, the present invention is not limited to this. At least one of the light sensors may be provided to the inspection device 20 so as to be capable of displacement. An inspection system S provided with such an inspection device 20 is described next.

Second Exemplary Configuration of Inspection System S

Figure 3:
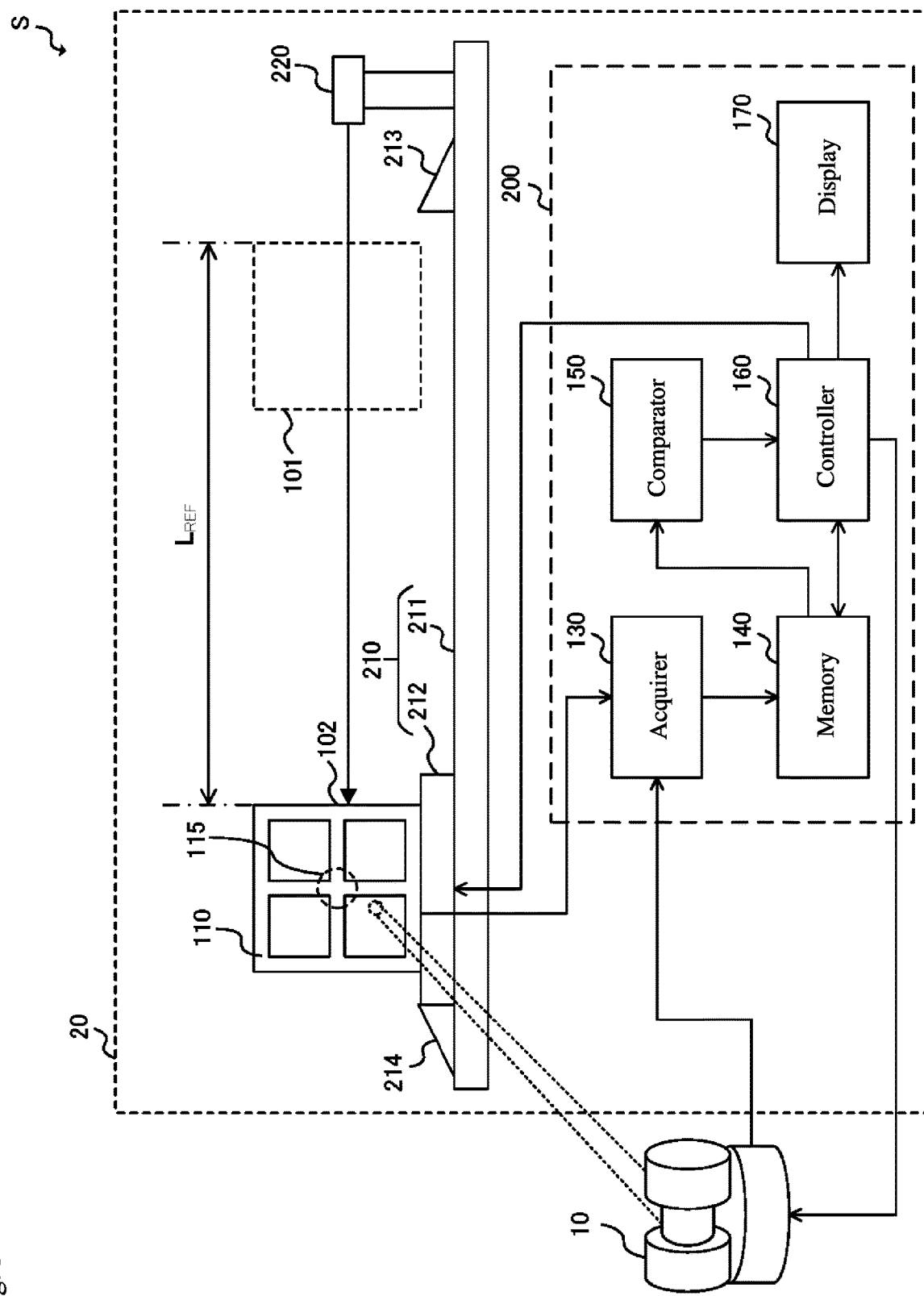
FIG. 3 is a second exemplary configuration of the inspection system S according to the embodiment.

FIG. 3 illustrates a second exemplary configuration of an inspection system S according to the present embodiment. In the second exemplary configuration of the inspection system S, operations that are substantially the same as those of the inspection system S according to the present embodiment as illustrated in FIG. 1 are given the same reference numerals and a description thereof is omitted. The second exemplary configuration of the inspection system S further includes a displacer 210 and a length measurer 220.

The displacer 210 may displace the first sensor 110 from the predetermined first region 101 of the casing 100 to the second region 102, which is separated by a predetermined reference interval in a predetermined direction from the first region 101. The displacer 210 may include an actuator such as a motor, for example, and may displace the first sensor 110 unidirectionally. FIG. 3 illustrates an example where the displacer 210 includes a rail 211 and a carriage 212 which displaces over the rail 211. FIG. 3 also illustrates an example where the first sensor 110 is provided to the carriage 212. The displacer 210 may displace the first sensor 110 by the reference interval $L_{REF}$ in response to a control signal of the controller 160, for example.

The length measurer 220 measures the distance over which the displacer 210 displaces the first sensor 110. The length measurer 220 is a laser interferometer, for example. The length measurer 220 may fire laser light at the first sensor 110 or the carriage 212 and collect the reflected laser light to measure the displacement distance of the displacer 210. Alternatively, the length measurer 220 may be a linear encoder, for example. The length measurer 220 may also be a position detection sensor provided on the rail 211.

In addition, a stopper 213 is preferably provided on a first end of the rail 211 for positioning the carriage 212 such that the first sensor 110 overlaps with the first region 101, for example. By doing so, after the displacer 210 displaces the first sensor 110 to the second region 102, it can readily be returned to the first region 101 once more. Furthermore, a stopper 214 may also be provided on a second end of the rail 211, on the opposite side from the first end, for positioning the carriage 212 such that the first sensor 110 overlaps with the second region 102. Moreover, when the degree of positioning accuracy of the stopper 213 and the stopper 214 satisfies the measurement accuracy for the second measurement distance, the length measurer 220 may be omitted.

Second Exemplary Operation Flow for Inspection System S

Figure 4:
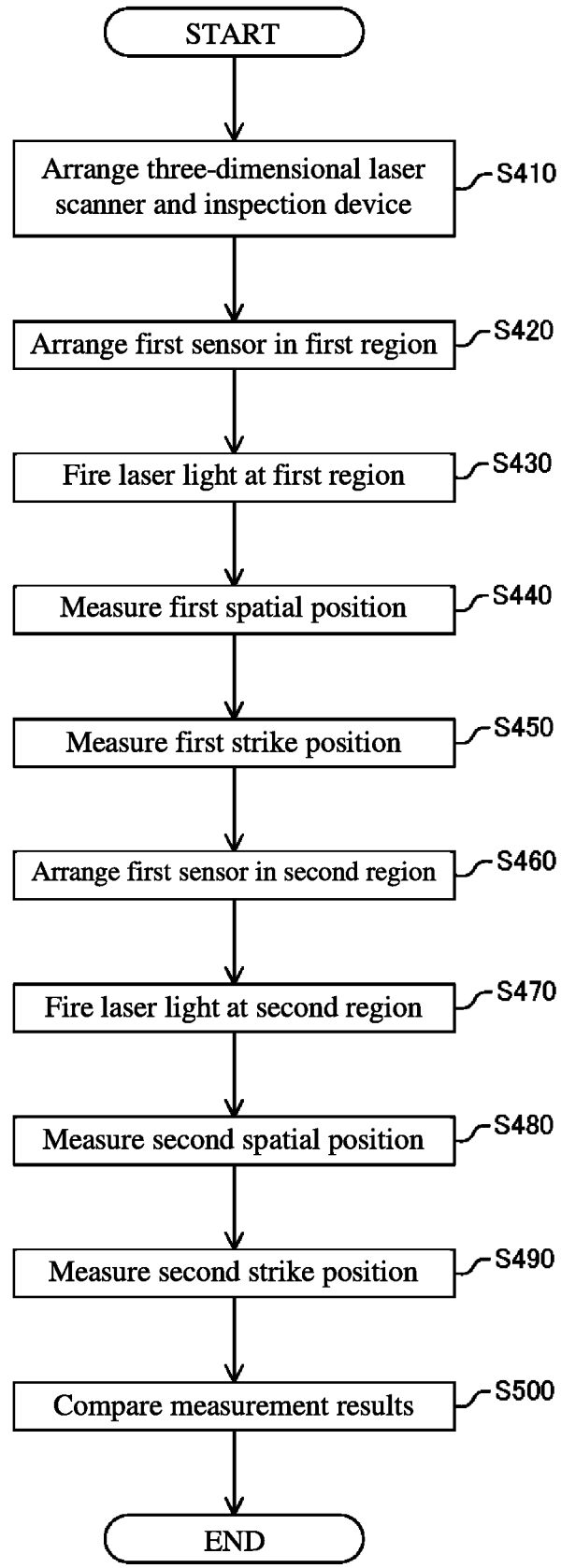
FIG. 4 is a second exemplary operation flow for the inspection system S according to the embodiment.

FIG. 4 is a second exemplary operation flow for the inspection system S according to the present embodiment. First, the three-dimensional laser scanner 10 and the inspection device 20 are arranged (S410). The arrangement of the three-dimensional laser scanner 10 and the inspection device 20 is illustrated in FIG. 2, and therefore a description thereof is omitted in the present discussion. Next, the first sensor 110 is arranged in the first region 101 (S420). The controller 160 displaces the displacer 210 to an initial position, for example. The position of the first sensor 110 may also be measured using the length measurer 220 to confirm that the first sensor 110 is arranged in the first region 101. In addition, the displacer 210 may be displaced until the carriage 212 makes contact with the stopper 213.

Next, the controller 160 controls the three-dimensional laser scanner 10 to fire laser light at the first region 101 of the inspection device 20 (S430). Then the three-dimensional laser scanner 10 emits laser light at the first sensor 110 that is positioned in the first region 101 and measures the first spatial position (S440). The acquirer 130 acquires the measurement results of the three-dimensional laser scanner 10 for the first spatial position. Next, the inspection device 20 measures the first strike position using the first sensor 110 positioned in the first region 101 (S450). The acquirer 130 acquires the measurement results of the inspection device 20 for the first strike position.

Next, the first sensor 110 that is positioned in the first region 101 is displaced by the predetermined reference interval in the predetermined direction and is positioned in the second region 102 (S460). The controller 160 controls the displacer 210 to displace the first sensor 110. The controller 160 may, for example, displace the first sensor 110 by a predetermined distance to position the first sensor 110 in the second region 102. Then the length measurer 220 measures the distance over which the displacer 210 displaces the first sensor 110. In this example, the measurement results of the length measurer 220 are defined as the reference interval $L_{REF}$. Alternatively, the displacer 210 may be displaced until the carriage 212 makes contact with the stopper 214 and an interval based on the distance between the stopper 213 and the stopper 214 may be defined as the reference interval $L_{REF}$.

Next, the controller 160 controls the three-dimensional laser scanner 10 to fire laser light at the second region 102 of the inspection device 20, which is different from the first region 101 (S470). Then the three-dimensional laser scanner 10 measures the second spatial position where the laser light is emitted at the second region 102 (S480). By doing so, the three-dimensional laser scanner 10 emits laser light at the first sensor 110, which is displaced from the first region 101 and positioned in the second region 102, and measures the second spatial position. The acquirer 130 acquires the measurement results of the three-dimensional laser scanner 10 for the second spatial position.

Next, the inspection device 20 measures the second strike position using the first sensor 110 positioned in the second region 102 (S490). The acquirer 130 acquires the measurement results of the inspection device 20 for the second strike position. Next, the comparator 150 compares the measurement results for the first spatial position and second spatial position obtained by the three-dimensional laser scanner 10 with the measurement results for the first strike position and second strike position obtained by the inspection device 20 (S500). The comparison operation of the comparator 150 is illustrated in FIG. 2, and therefore a description thereof is omitted here.

As described above, the second exemplary configuration of the inspection device 20 includes the first sensor 110, which is provided so as to be capable of displacement from the first region 101 to the second region 102, and outputs similar measurement results as the first exemplary configuration of the inspection device 20. By doing so, the inspection device 20 can reduce the number of light sensors. In addition, the inspection device 20 may also displace the first sensor 110 to a plurality of different positions. In this way, the second exemplary configuration of the inspection system S can readily carry out inspection of the three-dimensional laser scanner 10 at each of a plurality of positions.

An example is described above of the second exemplary configuration of the inspection system S, in which the first sensor 110 is displaced unidirectionally. However, the present invention is not limited to this. The inspection system S may also displace the first sensor 110 in a plurality of directions, in an input direction, in an arbitrary direction, or the like. Such an inspection system S is described next.

Third Exemplary Configuration of Inspection System S

Figure 5:
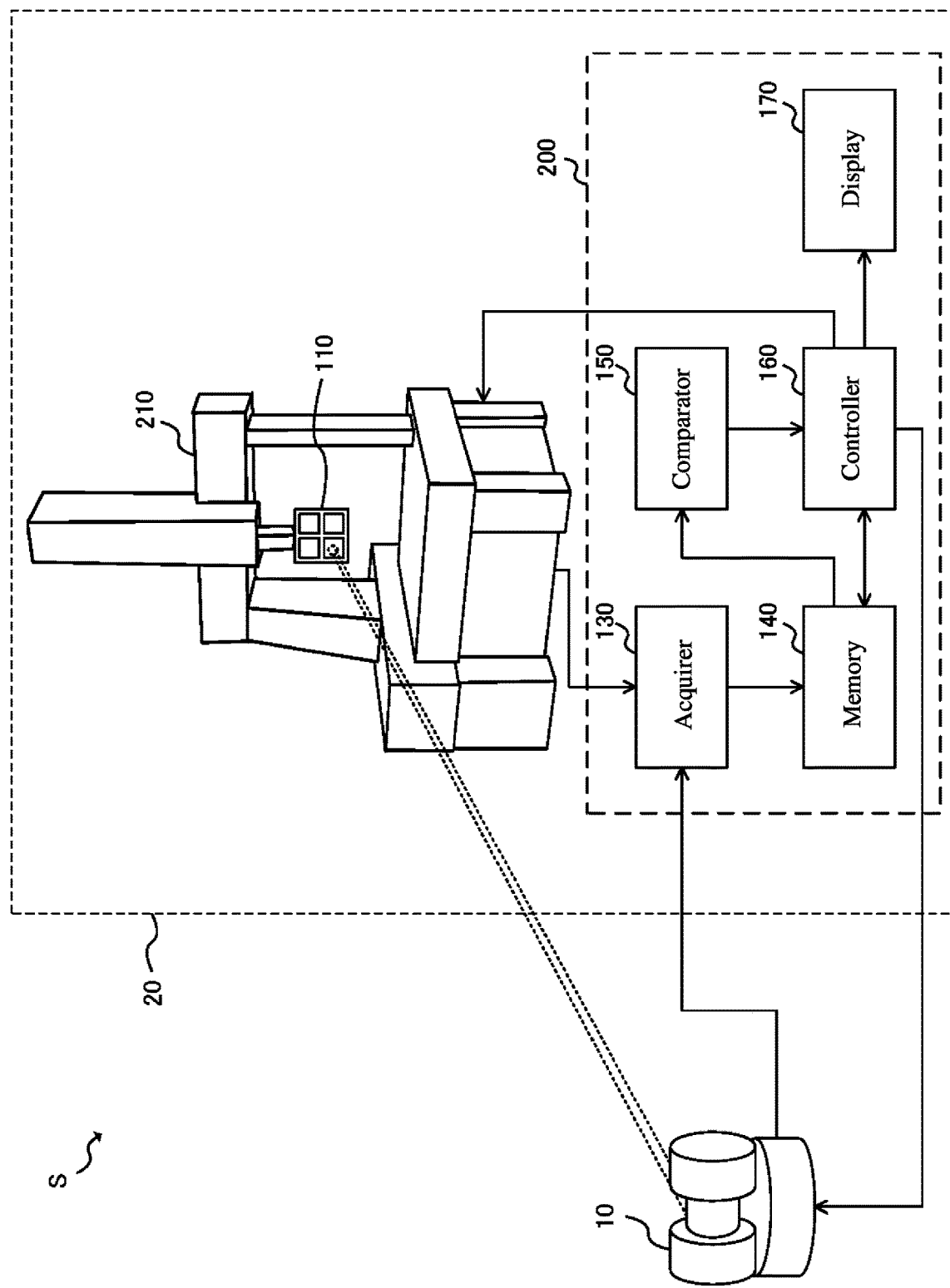
FIG. 5 is a third exemplary configuration of the inspection system S according to the embodiment.

FIG. 5 illustrates a third exemplary configuration of an inspection system S according to the present embodiment. In the third exemplary configuration of the inspection system S, operations that are substantially the same as those of the inspection system S according to the present embodiment as illustrated in FIGS. 1 and 3 are given the same reference numerals and a description thereof is omitted. In the third exemplary configuration of the inspection system S, the displacer 210 is a positioning device (positioning frame) and the first sensor 110 is attached to the positioning device. In this way, the inspection device 20 may include a positioning device with an attached first sensor 110 and which is capable of displacing the first sensor 110 from the first region 101 to the second region 102.

The positioning device may be used, for example, to measure a solid three-dimensional shape and can measure a three-dimensional position. The positioning device may be, for example, a coordinate measuring device. The coordinate measuring device includes a probe capable of measuring a three-dimensional position and has the first sensor 110 attached to the probe. A displacer 210 such as this can displace the first sensor 110 three-dimensionally and also can measure the position of the displaced first sensor 110 to position the first sensor 110. Accordingly, the third exemplary configuration of the inspection system S need not measure the position of the first sensor 110 with the length measurer 220 or the like as described with the second exemplary configuration of the inspection system S.

Third Exemplary Operation Flow for Inspection System S

Figure 6:
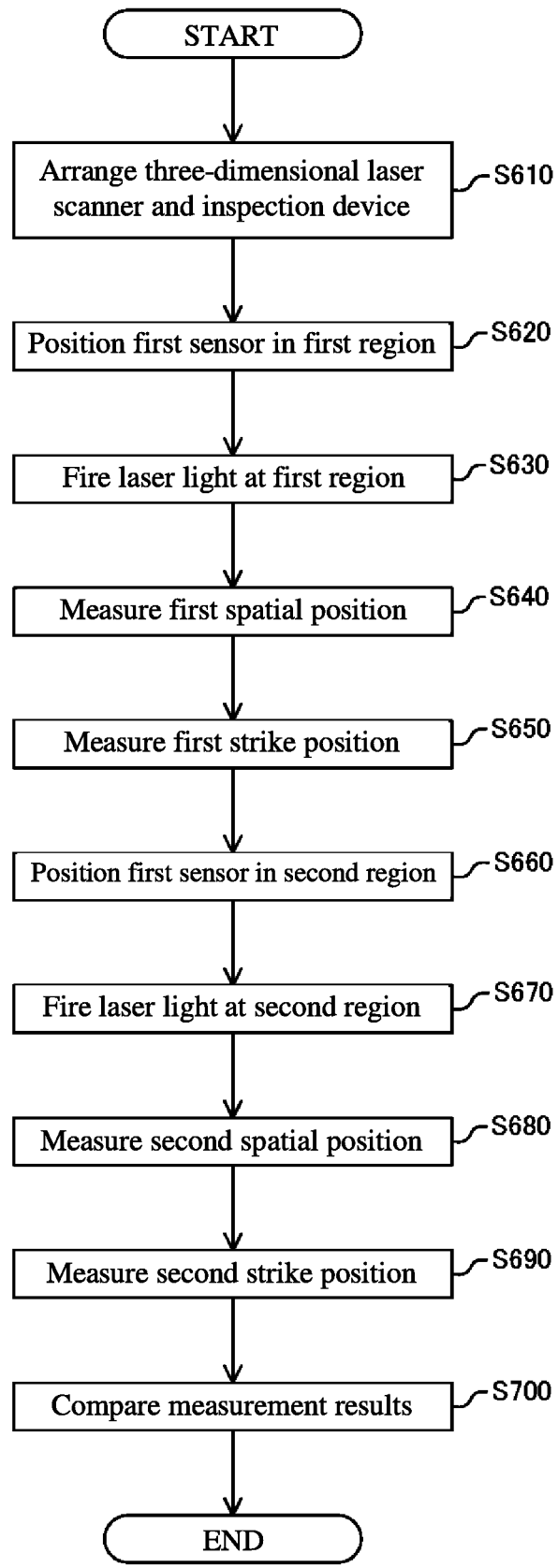
FIG. 6 is a third exemplary operation flow for the inspection system S according to the embodiment.

FIG. 6 is a third exemplary operation flow for the inspection system S according to the present embodiment. First, the three-dimensional laser scanner 10 and the inspection device 20 are arranged (S610). Next, the first sensor 110 is positioned in the first region 101 (S620). The controller 160 may, for example, send an instruction to the displacer 210 to displace the first sensor 110. The positioning device (displacer 210) may, for example, displace the first sensor 110 to the predetermined first region 101 to position the first sensor 110. The positioning device may also displace the first sensor 110 to a first region 101 designated by the user, for example, to position the first sensor 110. In this way, the first sensor 110 that is attached to the positioning device is positioned in the first region 101 using the positioning device.

Next, the controller 160 controls the three-dimensional laser scanner 10 to fire laser light at the first region 101 of the inspection device 20 (S630). Then the three-dimensional laser scanner 10 emits laser light at the first sensor 110 positioned in the first region 101 and measures the first spatial position (S640). The acquirer 130 acquires the measurement results of the three-dimensional laser scanner 10 for the first spatial position.

Next, the inspection device 20 measures the first strike position based on the position set by the positioning device and a detected position obtained by the first sensor 110 (S650). For example, the acquirer 130 may acquire coordinates for the position of the positioning device and detection results for the strike position of the laser obtained by the first sensor 110. The acquirer 150 may add detection results for the strike position of the laser obtained by the first sensor 110 to the coordinates for the position of the positioning device and calculate the first strike position. The first strike position may also be calculated by the controller 160. In such a case, the controller 160 preferably stores the calculated first strike position in the memory 140.

Next, the first sensor 110 is displaced from the first region 101 to the second region 102 by the positioning device and is positioned in the second region 102 to position the first sensor 110 (S660). The controller 160 may, for example, send an instruction to the displacer 210 to displace the first sensor 110. The positioning device may, for example, displace the first sensor 110 by a predetermined distance to position the first sensor 110 in the second region 102.

Next, the controller 160 controls the three-dimensional laser scanner 10 to fire laser light at the second region 102 of the inspection device 20, which is different from the first region 101 (S670). Then the three-dimensional laser scanner 10 measures the second spatial position where the laser light is emitted at the second region 102 (S680). The acquirer 130 acquires the measurement results of the three-dimensional laser scanner 10 for the second spatial position.

Next, the inspection device 20 measures the second strike position based on the position set by the positioning device and the detected position obtained by the first sensor 110 (S690). For example, the acquirer 130 may acquire coordinates for the position of the positioning device and detection results for the strike position of the laser obtained by the first sensor 110. The acquirer 150 or the controller 160 may add detection results for the strike position of the laser obtained by the first sensor 110 to the coordinates for the position of the positioning device and calculate the second strike position.

Next, the comparator 150 compares the measurement results for the first spatial position and second spatial position obtained by the three-dimensional laser scanner 10 with the measurement results for the first strike position and second strike position obtained by the inspection device 20 (S700). The comparator 150 may, for example, make the comparison after calculating the first measurement distance and the second measurement distance, as illustrated in FIG. 2. In such a case, as an example, the distance between the first spatial position and the second spatial position is defined as the first measurement distance and the distance between the first strike position and the second strike position is defined as the second measurement distance.

Alternatively, the comparator 150 may compare the coordinates measured by the three-dimensional laser scanner 10 with the coordinates measured by the inspection device 20. In such a case, the comparator 150 compares the coordinates for the first spatial position with the coordinates for the first strike position and compares the coordinates for second spatial position with the coordinates for the second strike position.

When the distances between the coordinates for the spatial positions and strike positions all match within a predetermined first range, for example, the comparator 150 may determine that the three-dimensional laser scanner 10 is an acceptable product. In addition, when at least one of the distances between the coordinates exceeds the predetermined first range and is within a predetermined second range, the comparator 150 may determine that the three-dimensional laser scanner 10 requires adjustment. Moreover, when at least one of the distances between the coordinates exceeds the predetermined second range, the comparator 150 may determine that the three-dimensional laser scanner 10 is an unacceptable product. Alternatively, the comparator 150 may output the distance between the coordinates for the spatial positions and the strike positions as the inspection results.

The controller 160 outputs the inspection results of the comparator 150 to the display 170. As noted above, the third exemplary configuration of the inspection device 20 includes the positioning device and positions the first sensor 110 in the predetermined region while displacing the first sensor 110. In this way, the inspection system S can readily acquire the position of the light sensor, and can easily carry out inspection of the three-dimensional laser scanner 10.

The inspection system S preferably causes the three-dimensional laser scanner 10 to carry out measurement in a plurality of at least three regions a plurality of times and outputs inspection results based on the plurality of measurement results. The inspection system S can easily carry out inspection of the three-dimensional laser scanner 10, and so can improve throughput for the plurality of measurement cycles. In addition, by measuring at a plurality of locations, the inspection of the three-dimensional laser scanner 10 can be carried out reliably.

As noted above, an example is described of the third exemplary configuration of the inspection device 20 which includes the positioning device and which positions the first sensor 110 in a predetermined region. However, the present invention is not limited to this. The positioning device may also displace to and position itself at the position struck by the laser light. Operations of such an inspection system S are described next.

Fourth Exemplary Operation Flow for Inspection System S

Figure 7:
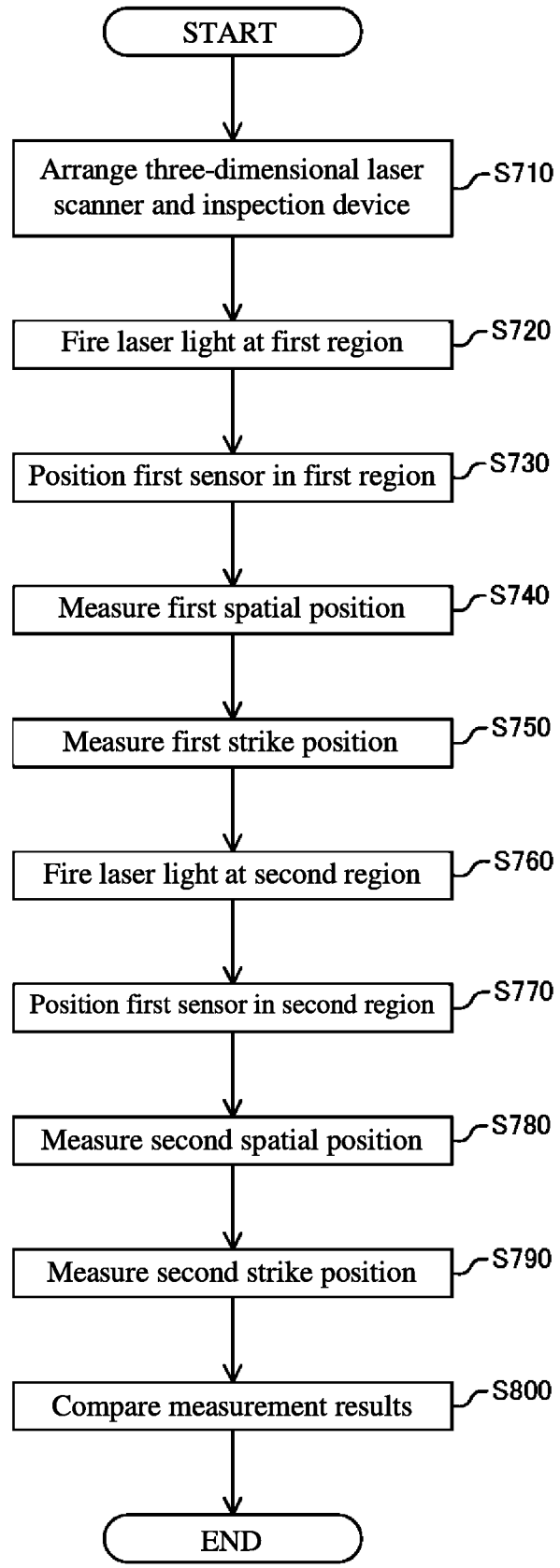
FIG. 7 is a fourth exemplary operation flow for the inspection system S according to the embodiment.

FIG. 7 is a fourth exemplary operation flow for the inspection system S according to the present embodiment. First, the three-dimensional laser scanner 10 and the inspection device 20 are arranged (S710). Next, the controller 160 controls the three-dimensional laser scanner 10 to fire laser light at the first region 101 of the inspection device 20 (S720).

Next, the first sensor 110 is displaced to position the first sensor 110 in the first region 101 (S730). The controller 160 may, for example, send an instruction to the displacer 210 to displace the first sensor 110. The positioning device (displacer 210) may displace and position the first sensor 110 to allow the first sensor 110 to collect the laser light emitted at the first region 101. The controller 160 may, as an example, issue a command to a displacement destination of the positioning device such that the collected light intensity of the first sensor 110 is within a predetermined range of intensity levels. Then, in response to the first sensor 110 collecting the laser light, the positioning device may stop the displacement of the first sensor 110 to position the first sensor 110.

Next, the controller 160 controls the three-dimensional laser scanner 10 to measure the first spatial position of the laser light emitted at the first sensor 110 (S740). Also, the inspection device 20 measures the first strike position based on the position in the first region 101 set by the positioning device and the detected position obtained by the first sensor 110 (S750).

Next, the controller 160 controls the three-dimensional laser scanner 10 to fire laser light at the second region 102 of the inspection device 20, which is different from the first region 101 (S760). Next, the first sensor 110 is displaced and positioned in the second region 102 (S770). The positioning device may displace and position the first sensor 110 such that the first sensor 110 collects the laser light emitted at the second region 102. The controller 160 may, for example, issue a command to a displacement destination of the positioning device to position the first sensor 110, similar to the positioning in the first region 101.

Next, the controller 160 controls the three-dimensional laser scanner 10 to measure the second spatial position of the laser light emitted at the first sensor 110 (S780). Also, the inspection device 20 measures the second strike position based on the position in the second region 102 set by the positioning device and the detected position obtained by the first sensor 110 (S790).

Next, the comparator 150 compares the measurement results for the first spatial position and second spatial position obtained by the three-dimensional laser scanner 10 with the measurement results for the first strike position and second strike position obtained by the inspection device 20 (S800). The comparison operation of the comparator 150 has been described previously, and therefore a description thereof is omitted here.

As in the fourth exemplary operation flow noted above, the third exemplary configuration of the inspection device 20 may include the first sensor 110 and the positioning device to which the first sensor 110 is attached and which is capable of displacing the first sensor 110 from the first region 101 to the second region 102. This inspection device 20 displaces the position of the first sensor 110 and positions the first sensor 110 so as to be capable of collecting laser light. Even in such a case, the inspection system S can readily acquire the position of the light sensor, and can easily carry out inspection of the three-dimensional laser scanner 10.

An example is described above of the operations of the inspection system S according to the present embodiment, in which the inspection device 20 measures the second strike position after the three-dimensional laser scanner 10 measures the spatial positions. However, the present invention is not limited to this. The three-dimensional laser scanner 10 may also measure the spatial positions after the inspection device 20 measures the second strike position. In addition, the measurement of the spatial positions by the three-dimensional laser scanner 10 and the measurement of the second strike position by the inspection device 20 may also be carried out in parallel.

An example is described above of the inspection system S according to the present embodiment which inspects the three-dimensional laser scanner 10. However, the present invention is not limited to this. The inspection system S may also calculate a correction value for correcting the measurement results of the three-dimensional laser scanner 10 for the spatial positions based on the inspection results after inspecting the three-dimensional laser scanner 10.

The inspection system S can acquire a measured value for the position of a light sensor obtained by the three-dimensional laser scanner 10 and the measurement results for the actual strike position of the laser light, and therefore measurement error in the three-dimensional laser scanner 10 can be understood. In this connection, for example, the controller 160 may calculate the correction value for correcting the measurement results of the three-dimensional laser scanner 10 so as to reduce the measurement error and supply the correction value to the three-dimensional laser scanner 10. Accordingly, the three-dimensional laser scanner 10 can output more accurate measurement results by using such a correction value.

At least a portion of the control device 200 according to the present embodiment, described above, is configured by an integrated circuit, for example. In such a case, at least a portion of the acquirer 130, the memory 140, the comparator 150, and the controller 160 may include a field programmable gate array (FPGA), a digital signal processor (DSP), and/or a central processing unit (CPU).

When a computer or the like carries out operations as the acquirer 130, the comparator 150, and the controller 160, for example, the memory 140 may also store an operating system (OS) that allows the computer to function, and store information such as a program. In addition, the memory 140 may also store various kinds of information, including a database that is referenced when executing the program. The computer may, for example, carry out operations as at least a portion of the acquirer 130, the memory 140, the comparator 150, the controller 160, and the display 170 by executing a program stored in the memory 140.

The memory 140 may include, for example, a read-only memory (ROM) that stores a basic input/output system (BIOS) for a computer or the like and a random access memory (RAM) that serves as a workspace. In addition, the memory 140 may also include a high-capacity memory device such as a hard disk drive (HDD) and/or a solid state drive (SSD). Furthermore, the computer may further include a graphics processing unit (GPU), for example.

The present invention is described above by way of an embodiment, but the technical scope of the present invention is not limited to that described in the embodiment above, and various modifications and changes are possible within the scope of the description. For example, all or a portion of the devices can be configured to be functionally or physically separated or integrated in any desired units. In addition, novel embodiments produced by the arbitrary combination of a plurality of embodiments are also included in the scope of the embodiment of the present invention. The benefits of a novel embodiment produced by such combination also include the benefits of the original embodiment of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An inspection method for a three-dimensional laser scanner that measures a spatial position, which is a position where laser light is emitted at a measurable object, by emitting the laser light toward the measurable object and collecting light reflected by the measurable object, the method comprising:
    measuring, with the three-dimensional laser scanner, a first spatial position where the laser light is emitted at and reflected off of a first portion of a first sensor positioned on an inspection device, by emitting the laser light at the first sensor in a first region;
    measuring, with a second portion of the first sensor, a first strike position where the first sensor is struck by and collects the laser light in the first region;
    measuring, with the three-dimensional laser scanner, a second spatial position where the laser light is emitted at and reflected off of a first portion of a second sensor positioned on the inspection device that is different from the position of the first sensor, by emitting the laser light at the second sensor in a second region;
    measuring, with a second portion of the second sensor, a second strike position where the second sensor is struck by and collects the laser light in the second region; and
    comparing measurement results for the first spatial position and the second spatial position obtained by the three-dimensional laser scanner with measurement results for the first strike position and the second strike position obtained by the inspection device.

2. The inspection method according to claim 1, wherein:
    the inspection device includes:
    the first sensor provided in the first region, and
    the second sensor provided in the second region, separated from the first sensor by a predetermined reference interval in a predetermined direction,
    the measuring of the first spatial position comprises emitting the laser light at the first portion of the first sensor to measure the first spatial position, and
    the measuring of the second spatial position comprises emitting the laser light at the first portion of the second sensor to measure the second spatial position.

3. The inspection method according to claim 1, wherein:
    the inspection device includes the first sensor displaceable from the first region to the second region,
    the measuring of the first spatial position comprises emitting the laser light at the first portion of the first sensor, which is positioned in the first region, to measure the first spatial position;
    the measuring of the first strike position comprises measuring the first strike position with the second portion of the first sensor, which is positioned in the first region,
    the measuring of the second spatial position comprises emitting the laser light at the first portion of the first sensor, which is displaced from the first region and positioned in the second region, to measure the second spatial position, and
    the measuring of the second strike position comprises measuring the second strike position with the second portion of the first sensor, which is positioned in the second region.

4. The inspection method according to claim 3, wherein the measuring of the second spatial position further comprises displacing the first sensor that is positioned in the first region by the predetermined reference interval in the predetermined direction to position the first sensor in the second region.

5. The inspection method according to claim 3, wherein the inspection device includes an actuator to which the first sensor is attached and which displaces the first sensor from the first region to the second region.

6. The inspection method according to claim 5, wherein:
    the measuring of the first spatial position further comprises positioning the first sensor, which is attached to the actuator, within the first region using the actuator,
    the measuring of the first strike position further comprises measuring the first strike position based on the position set by the actuator and a detected position obtained by the first sensor,
    the measuring of the second spatial position further comprises displacing the first sensor from the first region to the second region and positioning the first sensor within the second region using the actuator, and
    the measuring of the second strike position further comprises measuring the second strike position based on the position set by the actuator and the detected position obtained by the first sensor.

7. The inspection method according to claim 5, wherein the actuator is a coordinate measuring device.

8. The inspection method according to claim 5, wherein the comparing comprises:
    comparing coordinates for the first spatial position with coordinates for the first strike position; and
    comparing coordinates for the second spatial position with coordinates for the second strike position.

9. The inspection method according to claim 1, wherein:
    the inspection device includes:
    the first sensor; and
    an actuator to which the first sensor is attached and which displaces the first sensor from the first region to the second region, the measuring of the first spatial position comprises:
    displacing and positioning the first sensor using the actuator such that the first portion of the first sensor collects and reflects the laser light emitted at the first region; and
    measuring, with the three-dimensional laser scanner, the first spatial position of the laser light emitted at and reflected off of the positioned first portion of the first sensor,
    the measuring the first strike position comprises measuring the first strike position based on a position within the first region set by the actuator and a detected position obtained by the second portion of the first sensor, the measuring of the second spatial position comprises:
displacing and positioning the first sensor using the actuator such that the first portion of the first sensor collects and reflects the laser light emitted at the second region; and
measuring, with the three-dimensional laser scanner, the second spatial position of the laser light emitted at and reflected off of the positioned first portion of the first sensor, and the measuring of the second strike position comprises measuring the second strike position based on a position within the second region that is set by the actuator and a detected position obtained by the second portion of the first sensor after displacement.

10. The inspection method according to claim 1, wherein the comparing comprises:
calculating, based on the first spatial position and the second spatial position, a first measurement distance between the positions in the first region and the second region where the laser light strikes;
calculating, based on the first strike position and the second strike position, a second measurement distance between the positions in the first region and the second region where the laser light strikes; and
comparing the first measurement distance with the second measurement distance.

11. A correction method for a three-dimensional laser scanner comprising:
inspecting the three-dimensional laser scanner that measures a spatial position, which is a position where laser light is emitted at a measurable object, by emitting the laser light toward the measurable object and collecting light reflected by the measurable object, the inspecting comprising:
measuring, with the three-dimensional laser scanner, a first spatial position where the laser light is emitted at and reflected off of a first portion of a first sensor positioned on an inspection device by emitting the laser light at the first sensor in the first region;
measuring with a second portion of the first sensor, a first strike position where the first sensor is struck by and collects the laser light in the first region;
measuring, with the three-dimensional laser scanner, a second spatial position where the laser light is emitted at and reflected off of a second region of first portion of a second sensor positioned on the inspection device that is different from the first region position of the first sensor, by emitting the laser light at the second sensor in a second region;
measuring a second strike position with a second portion of the second sensor, where the second sensor is struck by and collects the laser light in the second region; and comparing measurement results for the first spatial position and the second spatial position obtained by the three-dimensional laser scanner with measurement results for the first strike position and the second strike position obtained by the inspection device; and
thereafter calculating a correction value for correcting the measurement results of the three-dimensional laser scanner for the first and second spatial positions based on inspection results.

12. An inspection device used to inspect a three-dimensional laser scanner that measures a spatial position, and it methods of use, which is a position where laser light is emitted at a measurable object, by emitting the laser light toward the measurable object and collecting light reflected by the measurable object, the inspection device comprising: a casing; a first sensor provided in a first region of the casing and which includes a first portion to receive and reflect the emitted laser light, and a second portion to receive and collect the emitted laser light; and a second sensor provided in a second region, separated from the first sensor by a predetermined reference interval in a predetermined direction, and which includes a first portion to receive and reflect the emitted laser light, and a second portion to receive and collect the emitted laser light.

13. The inspection device according to claim 12, wherein the first portion of the first sensor causes at least a portion of the incident light to undergo one of diffused reflection or retroreflection.

14. An inspection device used to inspect a three-dimensional laser scanner that measures a spatial position, which is a position where laser light is emitted at a measurable object, by emitting the laser light toward the measurable object and collecting light reflected by the measurable object, the inspection device comprising:
a casing;
a first sensor positioned on the inspection device and which includes a first portion to receive and reflect the emitted laser light, and a second portion to receive and collect the emitted laser light; and
an actuator, that displaces the first sensor from a predetermined first region of the casing to a second region that is separated from the first region by a predetermined reference interval in a predetermined direction.

15. The inspection device according to claim 14, wherein:
the actuator is a positioning frame, and
the first sensor is attached to the positioning frame.

16. The inspection device according to claim 15, wherein a light collecting surface of the first sensor includes a region that causes the first portion of the first sensor causes at least a portion of the incident light to undergo one of diffused reflection or retroreflection.

17. The inspection device according to claim 14, wherein the first portion of the first sensor causes at least a portion of the incident light to undergo one of diffused reflection or retroreflection.

* * * * *

UNITED STATES PATENT AND TRADEMARK OFFICE
CERTIFICATE OF CORRECTION

| | |
|---|---|
| PATENT NO. | : 11,359,910 B2 |
| APPLICATION NO. | : 16/990269 |
| DATED | : June 14, 2022 |
| INVENTOR(S) | : M. Nara |

It is certified that error appears in the above-identified patent and that said Letters Patent is hereby corrected as shown below:

In the Claims

Column 19, Line 48 (Claim 11, Line 19) please change "a second region of first" to -- a first --
Column 19, Line 50 (Claim 11, Line 21) please change "the first region position" to -- the position --
Column 20, Lines 12-13 (Claim 12, Lines 2-3) please change "position, and it methods of use," to -- position, --
Column 20, Lines 48-50 (Claim 16, Lines 1-3) please change "wherein a light collecting surface of the first sensor includes a region that causes the" to -- wherein the --

Signed and Sealed this
Eighteenth Day of October, 2022

Katherine Kelly Vidal
*Director of the United States Patent and Trademark Office*